(12) United States Patent
Matsuno et al.

(10) Patent No.: US 8,650,982 B2
(45) Date of Patent: Feb. 18, 2014

(54) ELECTRIC TELESCOPIC STEERING APPARATUS

(75) Inventors: Mitsuyoshi Matsuno, Kosai (JP); Tadao Ito, Toyohashi (JP); Takeshi Miyagi, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 102 days.

(21) Appl. No.: 13/170,823

(22) Filed: Jun. 28, 2011

(65) Prior Publication Data

US 2011/0314954 A1    Dec. 29, 2011

(30) Foreign Application Priority Data

Jun. 29, 2010    (JP) .................................. 2010-147023

(51) Int. Cl.
B62D 1/18    (2006.01)

(52) U.S. Cl.
USPC .............................................. 74/493; 74/492

(58) Field of Classification Search
USPC .............................. 74/492, 493; 280/775, 777
See application file for complete search history.

(56) References Cited

U.S. PATENT DOCUMENTS

| 5,178,411 | A  | * | 1/1993  | Fevre et al.       | 280/775 |
| 5,806,890 | A  | * | 9/1998  | Sugiki et al.      | 280/775 |
| 5,911,789 | A  | * | 6/1999  | Keipert et al.     | 74/493  |
| 6,079,743 | A  | * | 6/2000  | Grams              | 280/775 |
| 7,025,380 | B2 | * | 4/2006  | Arihara            | 280/775 |
| 7,159,904 | B2 | * | 1/2007  | Schafer et al.     | 280/775 |
| 7,410,190 | B2 | * | 8/2008  | Sawada et al.      | 280/777 |
| 7,886,630 | B2 | * | 2/2011  | Tomaru et al.      | 74/493  |
| 8,146,945 | B2 | * | 4/2012  | Born et al.        | 280/775 |
| 8,161,839 | B2 | * | 4/2012  | Warashina          | 74/493  |
| 2004/0023746 | A1 | * | 2/2004  | Arihara         | 475/280 |
| 2007/0068311 | A1 | * | 3/2007  | Shimoda et al.  | 74/493  |
| 2008/0047382 | A1 | * | 2/2008  | Tomaru et al.   | 74/388 PS |
| 2008/0079253 | A1 | * | 4/2008  | Sekii et al.    | 280/775 |
| 2008/0156138 | A1 | * | 7/2008  | Tomaru et al.   | 74/493  |
| 2009/0256341 | A1 | * | 10/2009 | Okada et al.    | 280/775 |
| 2009/0266187 | A1 | * | 10/2009 | Okada et al.    | 74/89.23 |
| 2009/0308189 | A1 | * | 12/2009 | Tomaru et al.   | 74/89.42 |

(Continued)

FOREIGN PATENT DOCUMENTS

| DE | 196 15 273 A1 | 10/1997 |
| EP | 1 693 279 A1  | 8/2006  |

(Continued)

*Primary Examiner* — David M Fenstermacher
*Assistant Examiner* — Zakaria Elahmadi
(74) *Attorney, Agent, or Firm* — Foley & Lardner LLP (57) ABSTRACT

An electric telescopic steering apparatus includes a jacket having a lower jacket and an upper jacket in order to telescope the jacket; and a screw shaft arranged along a longitudinal direction of the jacket and held under a rotation-locked state. The screw shaft includes one end portion supported by one of the lower jacket and the upper jacket. The electric telescopic steering apparatus further includes a nut screwed on another end portion of the screw shaft and supported by another of the lower jacket and the upper jacket; a driving section configured to drive a rotation of the nut; and a displacement absorbing section provided between the one end portion of the screw shaft and the jacket. The displacement absorbing section is configured to permit the one end portion of the screw shaft to be displaced on an X-Y plane defined by an imaginary X-axis and an imaginary Y-axis which are substantially perpendicular to an axis of the screw shaft, and configured to permit an angle of the axis of the screw shaft to vary about the X-axis and the Y-axis.

6 Claims, 4 Drawing Sheets

(56) References Cited

U.S. PATENT DOCUMENTS

2010/0282016 A1* 11/2010 Oehri et al. .................... 74/493
2011/0239809 A1* 10/2011 Beneker et al. ................ 74/493
2012/0247259 A1* 10/2012 Mizuno et al. ................. 74/493
2012/0304795 A1* 12/2012 Tinnin et al. ................... 74/493

FOREIGN PATENT DOCUMENTS

| JP | 9-240492 A | 9/1997 |
| JP | 2007-30527 A | 2/2007 |
| JP | 2008-94200 A | 4/2008 |

* cited by examiner

ELECTRIC TELESCOPIC STEERING APPARATUS

BACKGROUND OF THE INVENTION

The present invention relates to an electric telescopic steering apparatus adapted to absorb a deviation of a screw shaft which is used for a telescopic mechanism.

An electric telescopic steering apparatus for operating a telescopic mechanism by an electric motor has been used for a vehicle. Generally, the electric telescopic steering apparatus is constructed as follows. A telescopic jacket includes one jacket (element) and another jacket (element). The another jacket is provided to be able to slide in contact with the one jacket in an axial direction thereof. One end of a screw shaft disposed substantially parallel to the telescopic jacket is supported by the one jacket, and a nut is screwed on another end of the screw shaft. This nut is supported by the another jacket. One of the screw shaft and the nut is connected with a driving means, and another of the screw shaft and the nut is held by the telescopic jacket under a rotation-locked state. When a rotation of the one of the screw shaft and the nut is driven, the another jacket moves relative to the one jacket so that a telescopic adjustment is performed.

U.S. Pat. No. 5,806,890 (hereinafter referred to as Patent Document 1) corresponding to Japanese Patent Application Publication No. 9-240492 discloses a previously-proposed electric tilt steering apparatus, although this technique does not relate to a field of telescopic mechanism. In this technique, a universal joint is used for absorbing a deviation of axis (center line) of a shaft in a tilt mechanism.

SUMMARY OF THE INVENTION

However, in the above-mentioned general structure of electric telescopic steering apparatus, the another jacket on movable side fluctuates or swing due to push-and-pull pressures (a stressed state) caused during the telescopic adjustment if an axis (shaft center line) of the screw shaft is deviated from an axis of the nut to lose a parallel state between the screw shaft and the jacket. Thereby, a steering wheel and a combination switch including a wiper lever, a winker switch or the like which have been attached to the another jacket are fluctuated or swung. In such a case, manipulating feeling and visual quality are not favorable.

From this view point, it is conceivable that a structure in which the nut supports the another jacket through an elastic member is employed in order to absorb the deviation when the axis of the screw shaft deviates from the axis of the nut. However, in this case, there are a problem that a support rigidity is reduced, and a problem that the deviation comes to be insufficiently absorbed when the deviation of shaft axis becomes somewhat large.

On the other hand, it is conceivable that a structure in which the universal joint as used in the Patent Document 1 is provided to the screw shaft of the telescopic mechanism is employed in order to smoothly performing the telescopic adjustment by smoothly transmitting rotational force even if the screw shaft becomes nonparallel to the jacket.

However, in the case that the universal joint as mentioned in the electric tilt steering apparatus of the Patent Document 1 is provided to a some midpoint of the screw shaft of the telescopic mechanism, the provision point of the universal joint is largely displaced when an axial compressive force is applied to the universal joint. Hence, three supporting portions need to be formed for stably supporting the screw shaft. In this case, there are a problem that the number of components is increased, a problem that a freedom degree of layout is reduced, and a problem that an assembling performance is worsened.

It is therefore an object of the present invention to provide an electric telescopic steering apparatus devised to solve or ease the above-mentioned problems.

According to one aspect of the present invention, there is provided an electric telescopic steering apparatus comprising: a jacket including a lower jacket and an upper jacket configured to slide relative to the lower jacket in an axial direction of the lower jacket so as to telescope the jacket; a screw shaft arranged along a longitudinal direction of the jacket and held under a state where a rotation of the screw shaft is locked by the jacket, wherein the screw shaft includes one end portion supported by one of the lower jacket and the upper jacket; a nut screwed on another end portion of the screw shaft and supported by another of the lower jacket and the upper jacket; a driving section configured to drive a rotation of the nut; and a displacement absorbing section provided between the one end portion of the screw shaft and the jacket, wherein the displacement absorbing section is configured to permit the one end portion of the screw shaft to be displaced on an X-Y plane defined by an imaginary X-axis and an imaginary Y-axis which are substantially perpendicular to an axis of the screw shaft, wherein the displacement absorbing section is configured to permit an angle of the axis of the screw shaft to vary about the X-axis and the Y-axis.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention. Embodiments of electric telescopic steering apparatus according to the present invention will now be explained.

[First Embodiment]

At first, a first embodiment according to the present invention will now be explained.

(Structures)

Figure 2:
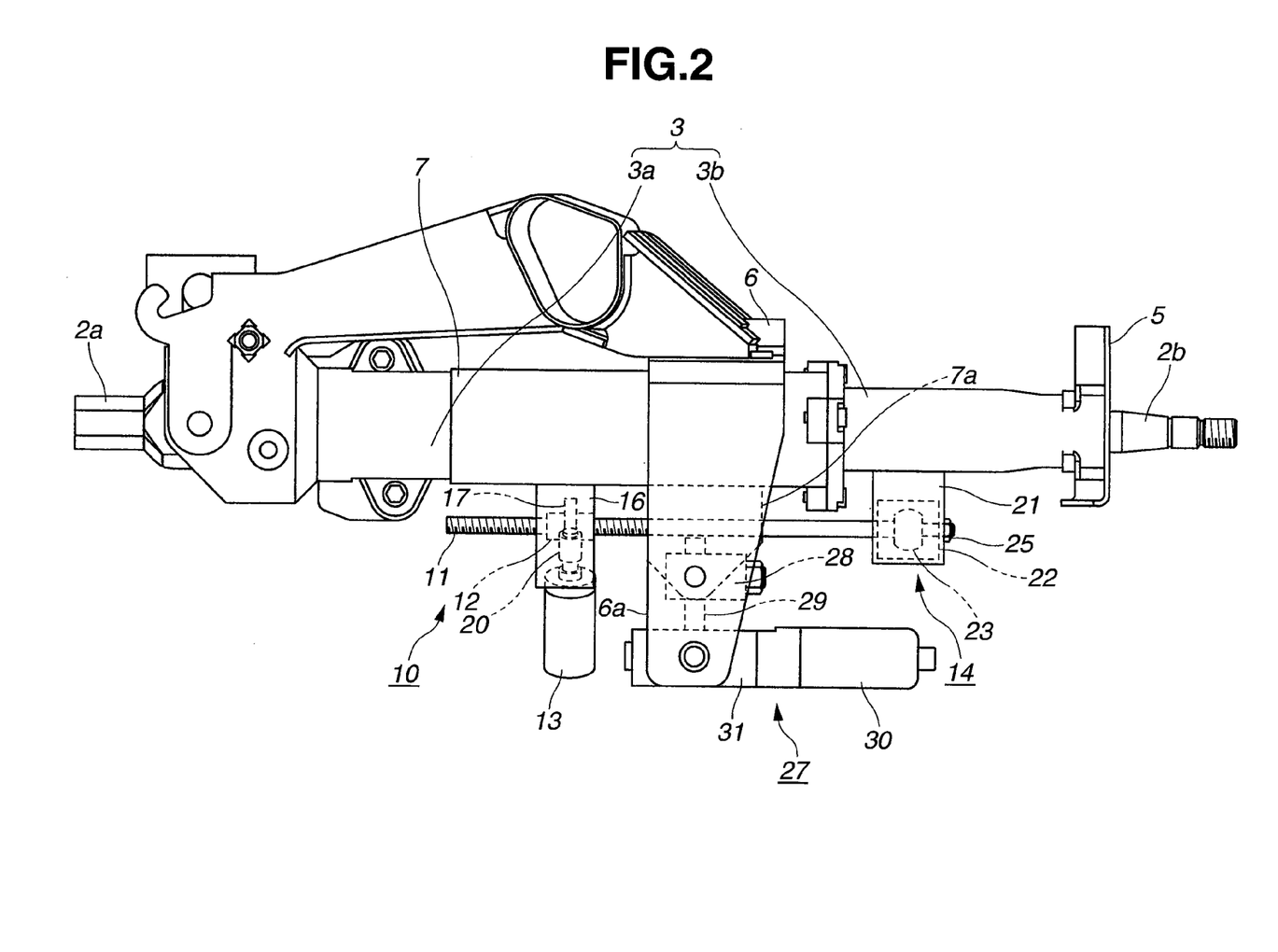
FIG. 2 is a front view of an electric telescopic steering apparatus in the first embodiment.
Figure 3:
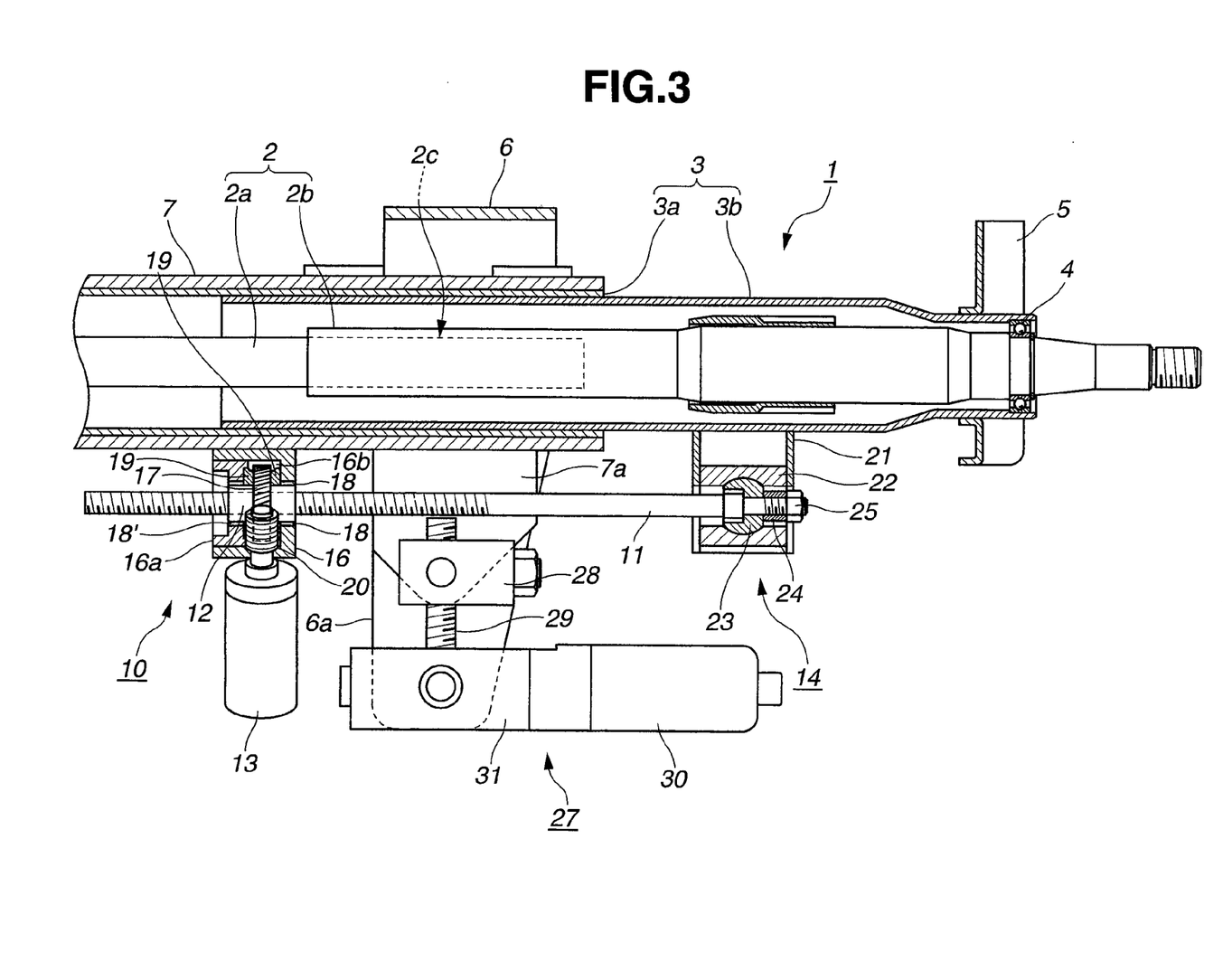
FIG. 3 is a front sectional view showing a main part of the electric telescopic steering apparatus in the first embodiment.

A steering apparatus 1 is constructed as shown in FIGS. 2 and 3. The steering apparatus 1 includes a jacket 3, and a shaft 2 having a lower shaft (shaft element) 2a and an upper shaft (shaft element) 2b. The lower shaft 2a is connected to a rack-and-pinion mechanism for operating a steerable road wheel(s) (not shown). The upper shaft 2b is able to slide on (slide in contact with) the lower shaft 2a, under a state where a relative rotation between the lower shaft 2a and the upper shaft 2b is restricted or locked by a spline-fitting portion 2c. Thereby, the shaft 2 is retractable, i.e., is capable of increasing and decreasing in length. That is, the shaft 2 can vary telescopically. A steering wheel (not shown) is provided on a tip portion of the upper shaft 2b. The jacket 3 includes a lower jacket (jacket element) 3a and an upper jacket (jacket element) 3b. The lower jacket 3a supports the lower shaft 2a through a bearing (not shown). The upper jacket 3b supports the upper shaft 2b through a bearing 4. A rack-and-pinion-side end (i.e., left end in FIG. 3) of the upper jacket 3b is inserted into a steering-wheel-side end (i.e., right end in FIG. 3) of the lower jacket 3a to be able to slide in contact with an inside of the lower jacket 3a. Thereby, the jacket 3 is retractable, i.e., is capable of increasing and decreasing in length. That is, the jacket 3 can telescope. A panel 5 for mounting a combination switch is provided to the upper jacket 3b.

In order to mount the jacket 3 onto a vehicle body, an upper portion of a vehicle-body bracket 6 is combined with (i.e., fixed to) the vehicle body. The vehicle-body bracket 6 is formed substantially in an inverted U-shape. The jacket 3 is disposed between a pair of bracket side-portions 6a of the vehicle-body bracket 6. The bracket side-portions 6a are positioned to drop from both sides of the upper portion of the vehicle-body bracket 6, i.e., extend in a direction almost perpendicular to an extending direction of (axis of) the jacket 3.

A telescopic mechanism 10 for moving the steering wheel (not shown) in an axial direction of the jacket 3 is provided to the jacket 3. A structure of the telescopic mechanism 10 will now be explained. The telescopic mechanism 10 includes a screw shaft 11, a displacement absorbing section (or means) 14, a telescopic-function nut 12 shaped like a circular tube, and a nut driving section (or means) for driving a rotation of the telescopic-function nut 12. The screw shaft 11 is disposed along the jacket 3, i.e. is disposed parallel to a longitudinal direction of the jacket 3, below the jacket 3. One end (steering-wheel-side end) of the screw shaft 11 is held by a lower surface of steering-wheel-side portion of the upper jacket 3b (i.e., held by a lower surface of right-side portion of the upper jacket 3b as viewed in FIG. 3) through the displacement absorbing section 14, under a state where a rotation of the screw shaft 11 is locked or restrained. On the other hand, another end (i.e., a rack-and-pinion-side end) of the screw shaft 11 is screwed into the telescopic-function nut 12. This telescopic-function nut 12 is rotatably supported by the lower jacket 3a through a housing 16. The nut driving means drives the rotation of the telescopic-function nut 12.

A structure near the another end of the screw shaft 11 whose rotation is locked will now be explained in detail. A worm wheel 17 is fixed to and fitted over a mid portion of the telescopic-function nut 12 relative to a longitudinal direction (axial direction) of the telescopic-function nut 12. In order to rotatably support the telescopic-function nut 12, the housing 16 is formed with a fitting hole 16b and a through hole 18. A cover member 16a is fitted into the fitting hole 16b, and is fixed to the housing 16 by screw-structure. Also, the cover member 16a is formed with a through hole 18' having a common axis with the through hole 18 of the housing 16. Thrust bearings 19 are provided respectively on axially both sides of the worm wheel 17. An outer circumferential portion of axially one end of the telescopic-function nut 12 is located in the through hole 18 of the housing 16. On the other hand, an outer circumferential portion of axially another end of the telescopic-function nut 12 is located in the through hole 18' of the cover member 16a. Thereby, an outer circumferential surface of the telescopic-function nut 12 is rotatably supported by the housing 16 and the cover member 16a at the through holes 18 and 18'. A first motor 13 is provided to the housing 16 as the nut driving means. A worm 20 provided to an output shaft of the first motor 13 is engaged with the worm wheel 17. Since the screw shaft 11 is arranged between the jacket 3 and the pair of bracket side-portions 6a, an axis of the output shaft of the first motor 13 extends from a point near the screw shaft 11 in an obliquely downward direction (i.e., in a direction oblique to a longitudinal direction of the bracket side-portion 6a).

Figures 1A, 1B:
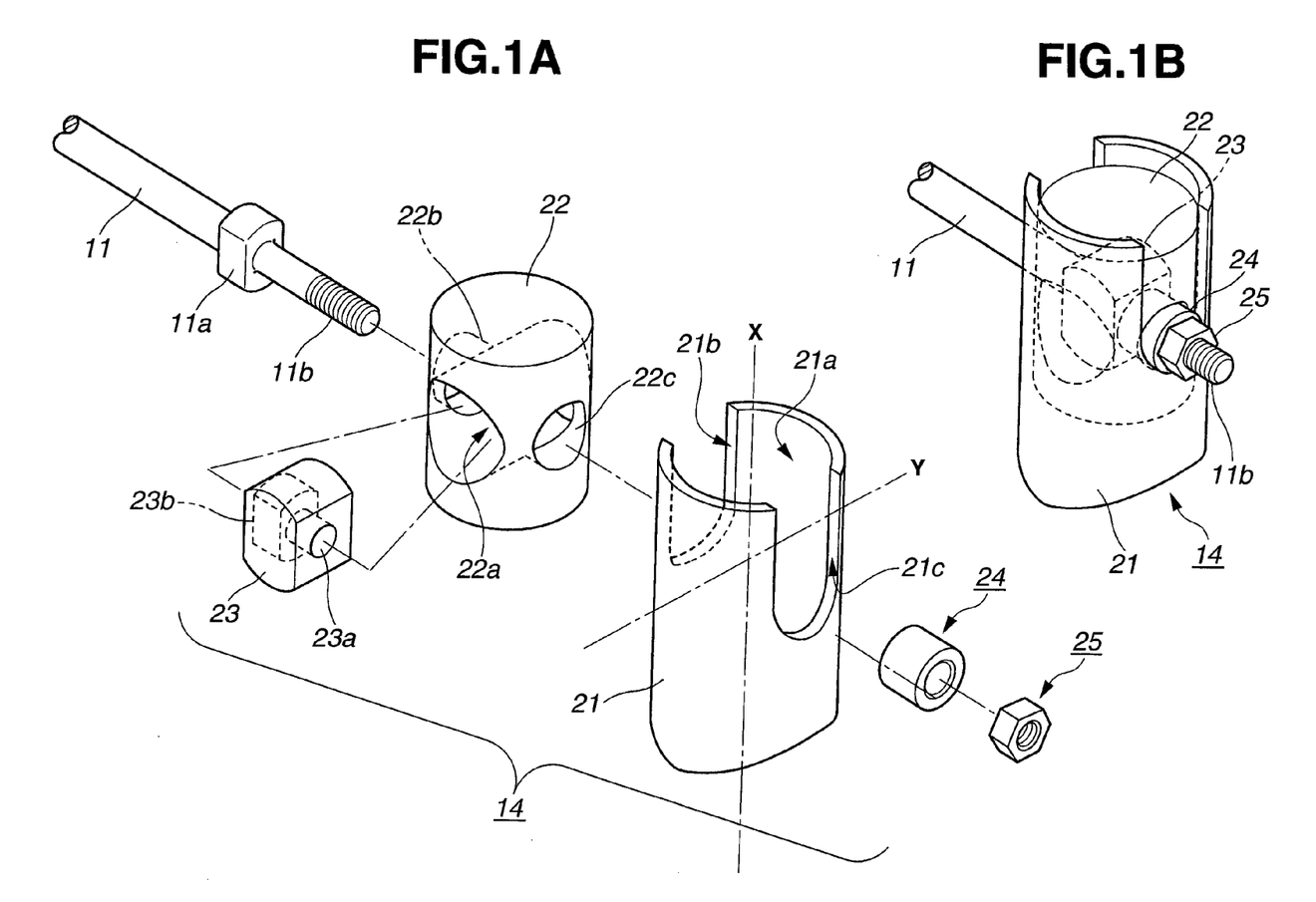
FIG. 1A is a schematic exploded view of a displacement absorbing section that is interposed between a jacket and one end of a non-rotatable screw shaft in a first embodiment according to the present invention.
FIG. 1B is an assembled state of the displacement absorbing section in the first embodiment.

Next, a structure of the displacement absorbing section 14 which functions to retain the one end of the screw shaft 11 under the rotation-locked state will now be explained in detail. The displacement absorbing section 14 is attached to the lower surface of the upper jacket 3b. The displacement absorbing section 14 is constructed as shown in FIG. 1A. X-axis and Y-axis that are approximately perpendicular to the axial direction of the screw shaft 11 under a stopped state of the screw shaft 11 (or perpendicular to the axial direction of the jacket 3) are imaginarily defined for descriptive purpose as shown in FIG. 1A. Since the another end of the screw shaft 11 is held by the telescopic-function nut 12 so as not to fluctuate or swing relative to the lower jacket 3a, there is a possibility that the one end of the screw shaft 11 is displaced along an X-Y plane defined by the X-axis and Y-axis if the one end of the screw shaft 11 is released (i.e., if the one end of the screw shaft 11 is not supported) in a case that the screw shaft 11 is not parallel to the jacket 3. Moreover, in this case, there is a possibility that an extending direction (axial direction) of the screw shaft 11 turns around the X-axis and the Y-axis to vary an extending angle of the screw shaft 11 during the rotation of the telescopic-function nut 12. That is, there is a possibility that an angle formed between the extending direction of the screw shaft 11 and the extending direction of the jacket 3 is varied. Hence, the displacement absorbing section 14 in this embodiment according to the present invention is configured to permit the displacement of the one end of the screw shaft 11 on the X-Y plane, and also to permit the extending angle of the screw shaft 11 to vary in the turning directions of the screw shaft 11 about the X-axis and the Y-axis.

That is, as shown in FIG. 1A, the displacement absorbing section 14 includes a base member 21, an intermediate member 22, a retaining member 23 and the like. The base member 21 is fixed to the lower surface of the upper jacket 3b. The base member 21 is formed in a circular tube shape (cylindrical shape) to have a first circular hole 21a. The first circular hole 21a passes along the X-axis that is substantially perpendicular to an axis (jacket-shaft center line) of the upper jacket 3b. A lower end of the base member 21 as viewed in FIG. 1A is fixedly combined with the lower surface of the upper jacket 3b. The intermediate member 22 is accommodated or received in the first circular hole 21a of the base member 21 to be able to slide in contact with the base member 21 and also to be able to rotate relative to the base member 21. The intermediate member 22 is formed in a cylindrical-column shape. The intermediate member 22 is formed with a second circular hole 22a having a hole axis (center line) conforming to the Y-axis. The hole axis of the second circular hole 22a intersects with an axis (shaft center line) of the screw shaft 11, and is substantially perpendicular to both of the axis of the screw shaft 11 and an axis (hole center line) of the first circular hole 21a which conforms to the X-axis. The retaining member 23 is accommodated or received in the second circular hole 22a of the intermediate member 22 to be able to slide in contact with the intermediate member 22 and also to be able to rotate relative to the intermediate member 22. The retaining member 23 retains the one end of the screw shaft 11 under the state where the rotation of the one end of the screw shaft 11 is being locked.

That is, the retaining member 23 is formed with a through hole 23a passing through the retaining member 23 along the axis of the screw shaft 11. Moreover, the retaining member 23 is formed with a rotation-preventing recess 23b which is continuous with the through hole 23a. The rotation-preventing recess 23b is located in a side of the retaining member 23 which is closer to the another end of the screw shaft 11 (i.e., closer to the telescopic-function nut 12). On the other hand, a rotation-preventing protrusion 11a is formed integrally with the screw shaft 11 at a point near the one end of the screw shaft 11. This rotation-preventing protrusion 11a is fitted into the rotation-preventing recess 23b. In order to prevent the relative rotation between the screw shaft 11 and the retaining member 23, each of the rotation-preventing recess 23b and the rotation-preventing protrusion 11a is formed in a shape obtained by giving a pair of mutually-parallel surfaces to an outer circumferential surface of cylindrical column. In other words, each of the rotation-preventing recess 23b and the rotation-preventing protrusion 11a has a shape defined by cutting an outer circumferential portion of a cylindrical column by a pair of mutually-parallel planes that are parallel to an axis of this cylindrical column. A tip portion of the screw shaft 11 is formed with a male thread portion 11b. The screw shaft 11 is inserted into the through hole 23a. A fixing nut 25 is screwed through a collar 24 onto the male thread portion 11b of the screw shaft 11 which has passed through the through hole 23a. In order to prevent the fixing nut 25 from coming loose, a lock nut may be further screwed on the male thread portion 11b. In order to pass the screw shaft 11 through the intermediate member 22, and also in order to avoid an interference between the intermediate member 22 and the one end of the screw shaft 11; the intermediate member 22 has an insertion hole 22b as a first escape portion. In the same manner, in order to pass the screw shaft 11 through the base member 21, and also in order to avoid an interference between the base member 21 and the one end of the screw shaft 11; the base member 21 has a U-shaped cutout portion (notch portion) 21b as a second escape portion. Moreover, in order to pass the collar 24 into the intermediate member 22, and also in order to avoid an interference between the intermediate member 22 and the collar 24; the intermediate member 22 has an insertion hole 22c as a third escape portion. In the same manner, in order to pass the collar 24 into the base member 21, and also in order to avoid an interference between the base member 21 and the collar 24; the base member 21 has a U-shaped cutout portion (notch portion) 21c as a fourth escape portion. These first to fourth escape portions function to prevent a contact with the screw shaft 11 or the collar 24 which might be caused due to the above-mentioned displacement and angle variation of the screw shaft 11 when the rotation of the telescopic-function nut 12 is driven. It is noted that the base member 21 may be formed with insertion holes instead of the cutout portions 21b and 21c.

The steering apparatus 1 further includes a tilt mechanism 27 for operating the steering wheel (not shown) in its upper and lower directions. A structure of the tilt mechanism 27 will now be briefly explained. As shown in FIG. 3, the tilt mechanism 27 includes a distance bracket 7 that surrounds the lower jacket 3a of the jacket 3. By lifting the distance bracket 7 relative to the vehicle-body bracket 6, the jacket 3 is turned about a tilt shaft in the upper and lower directions, so that the tilt function is achieved. In order to lift the distance bracket 7 relative to the vehicle-body bracket 6, the tilt mechanism 27 further includes a tilt nut 28, a screw shaft 29, a gear box 31 and a second motor 30. The tilt nut 28 is provided between a pair of protruding portions 7a that protrude downwardly from a lower portion of the distance bracket 7. The gear box 31 is fixedly combined with lower portions of both the bracket side-portions 6a of the vehicle-body bracket 6. The screw shaft 29 is provided at a center of the gear box 31, and extends in the upper direction (i.e., is formed to be long in the upper-lower direction). The gear box 31 disposed below the screw shaft 29 is connected to the second motor 30 through a worm and a worm wheel (not shown). An upper end portion of the screw shaft 29 is screwed into the tilt nut 28.

(Operations and Effects)

Next, operations and effects of the electric telescopic steering apparatus according to the first embodiment will now be explained.

According to this embodiment, an assembling of the displacement absorbing section 14 is as follows. As shown in FIG. 1A, at first, the retaining member 23 is inserted into the second circular hole 22a of the intermediate member 22. Then, the intermediate member 22 inside which the retaining member 23 has been disposed is inserted into the first circular hole 21a of the base member 21. Then, under a state where the intermediate member 22 and the retaining member 23 have been disposed inside the base member 21, the one end of the screw shaft 11 is inserted into the through hole 23a of the retaining member 23 via the cutout portion 21b and the insertion hole 22b. Then, the rotation-preventing protrusion 11a is fitted into the rotation-preventing recess 23b of the retaining member 23. Then, after the collar 24 is fitted over a part of the one end of the screw shaft 11 which corresponds to locations of the insertion hole 22c and the cutout portion 21c, the fixing nut 25 is screwed on the male thread portion 11b of the screw shaft 11. Thereby, the collar 24 is located to overlap with the insertion hole 22c and the cutout portion 21c in a radial direction of the screw shaft 11. Accordingly, as shown in FIG. 1B, a state is attained where the intermediate member 22 has been accommodated in the first circular hole 21a of the base member 21, the retaining member 23 has been accommodated in the second circular hole 22a of the intermediate member 22, and the one end of the screw shaft 11 has been combined and fixed with the retaining member 23.

According to this electric telescopic steering apparatus, after the base member 21, the intermediate member 22 and the retaining member 23 are set up together with one another, the one end of the screw shaft 11 is inserted and fixed to the through hole 23a of the retaining member 23 at last. Therefore, the setup for three of the base member 21, the intermediate member 22 and the retaining member 23 can be done in advance. As a result, an assembling workability of the displacement absorbing section 14 is superior.

The telescopic mechanism 10 operates as follows. When the first motor 13 is rotated in either direction, a rotation of the worm 20 provided to the output shaft of the first motor 13 is transmitted through the worm wheel 17 to the telescopic-function nut 12. Thereby, the telescopic-function nut 12 is rotated. Since the telescopic-function nut 12 has been screwed over the screw shaft 11, the screw shaft 11 moves in the axial direction thereof (i.e., in the right or left direction as viewed in FIGS. 2 and 3) together with the upper jacket 3b. That is, the upper jacket 3b slides in contact with the lower jacket 3a, so that a telescopic adjustment of the steering apparatus 1 is performed.

In the first embodiment, when the telescopic-function nut 12 is driven and rotated, the upper jacket 3b slides on the lower jacket 3a. Hence, there is a possibility that the one end of the screw shaft 11 which does not rotate tries to vary its position relative to the jacket 3 in vertical and lateral directions of the screw shaft 11 (i.e., in the above-mentioned X-Y plane). Moreover, there is a possibility that the angle formed between the upper jacket 3b and the screw shaft 11 tries to vary. In such cases, the displacement absorbing section 14 absorbs (permits) these variations.

According to the electric telescopic steering apparatus in the first embodiment, since the variations in relative location (position) and relative angle are absorbed by the displacement absorbing section 14, the upper jacket 3b smoothly slides on the lower jacket 3a even if the axis of the screw shaft 11 has deviated from a rotation axis of the telescopic-function nut 12. Therefore, at the time of telescopic adjustment, the upper jacket 3b of movable side can be prevented from fluctuating or swinging due to push-and-pull pressures (i.e., due to a stressed state) to fluctuate or swing the combination switch and the steering wheel which was attached through the panel 5 to the upper jacket 3b. Moreover, an operating noise which is caused due to the push-and-pull pressures (the stressed state) can be prevented.

That is, according to the first embodiment, the intermediate member 22 slides (in contact with the base member 21) along the X-axis in the first circular hole 21a of the base member 21 of the displacement absorbing section 14 as shown in FIG. 1B. Moreover, the retaining member 23 slides (in contact with the intermediate member 22) along the Y-axis in the second circular hole 22a of the intermediate member 22. Thereby, the one end of the screw shaft 11 whose rotation is locked is permitted to be displaced on the X-Y plane. Furthermore, the intermediate member 22 rotates (in contact with the base member 21) about the X-axis inside the first circular hole 21a of the base member 21, and the retaining member 23 rotates (in contact with the intermediate member 22) about the Y-axis inside the second circular hole 22a of the intermediate member 22. Thereby, the angle variation of the screw shaft 11 is permitted in the directions of the above-mentioned rotations using the X-axis and Y-axis as rotation centers.

According to the electric telescopic steering apparatus in the first embodiment, since the displacement absorbing section 14 is constituted by the base member 21, the intermediate member 22 received in the base member 21, and the retaining member 23 received in the intermediate member 22; the structure of the displacement absorbing section 14 is simple.

The operations of tilt adjustment by the tilt mechanism 27 are as follows. When the second motor 30 is rotated in either direction, the screw shaft 29 rotates in the corresponding direction relative to the tilt nut 28. Thereby, the distance bracket 7 moves together with the tilt nut 28, in the upper or lower direction relative to the vehicle-body bracket 6. Hence, the jacket 3 is rotated around the tilt shaft, so that the steering wheel (not shown) moves in the corresponding upper or lower direction thereof.

[Second Embodiment]

Next, a second embodiment according to the present invention will now be explained. In the second embodiment, the displacement absorbing section 14 of the first embodiment is partly modified into a displacement absorbing section 14' in order to make the assembling of the displacement absorbing section become easier. Explanations about structures same as those of the first embodiment will be omitted for a simplification of the disclosure. Only structures different from those of the first embodiment will now be explained.

(Structures)

Figure 4A:
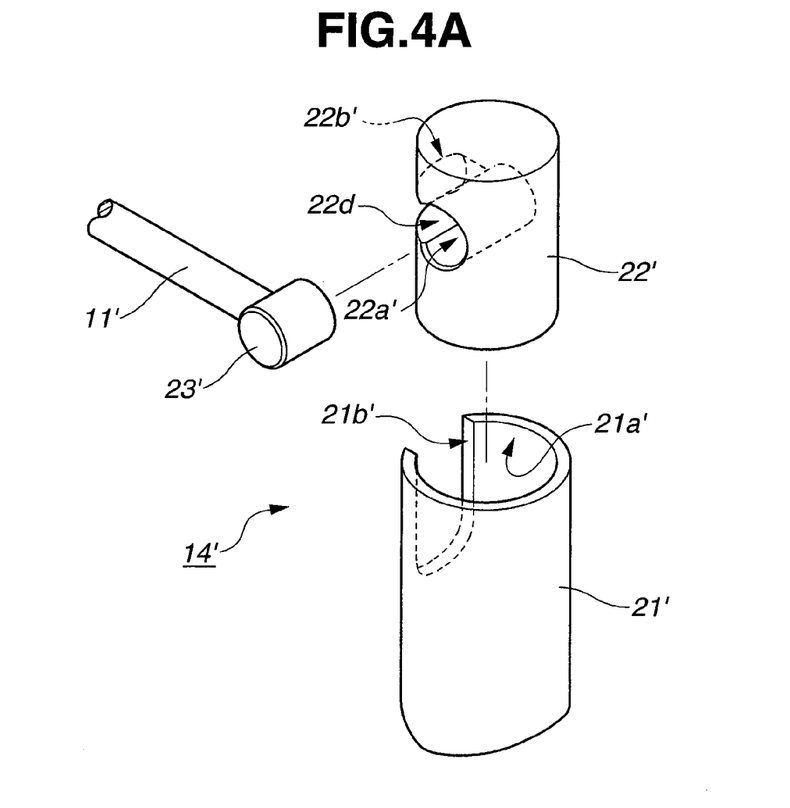
FIG. 4A is a schematic exploded view of a displacement absorbing section that is interposed between the jacket and one end of a non-rotatable screw shaft in a second embodiment according to the present invention.

As shown in FIG. 4A, a screw shaft 11' which corresponds to the screw shaft 11 of the first embodiment includes a retaining member 23' at one end (steering-wheel-side end) of the screw shaft 11'. The retaining member 23' is formed in a cylindrical-column shape. The retaining member 23' is formed integrally with the screw shaft 11'. An intermediate member 22' which corresponds to the intermediate member 22 of the first embodiment is formed with a second circular hole 22a' and an insertion hole 22b' which correspond respectively to the second circular hole 22a and the insertion hole 22b of the first embodiment. Moreover, the intermediate member 22' is formed with a first lateral-insertion cutout portion 22d. The first lateral-insertion cutout portion 22d is given for laterally inserting the one end of the screw shaft 11' into the insertion hole 22b', concurrently when the retaining member 23' is inserted into the second circular hole 22a'. In the second embodiment, the insertion hole 22c of the first embodiment is unnecessary and therefore is not provided. A base member 21' which corresponds to the base member 21 of the first embodiment is formed with a first circular hole 21a' which corresponds to the first circular hole 21a of the first embodiment. Moreover, the base member 21' is formed with a cutout portion (notch portion) 21b' having the same shape of the cutout portion 21b of the first embodiment. The cutout portion 21b' functions as the second escape portion and also as a second lateral-insertion cutout portion for laterally inserting the one end of the screw shaft 11' thereto, concurrently when the intermediate member 22' is inserted into the first circular hole 21a'. In the second embodiment, the cutout portion 21c of the first embodiment is unnecessary and therefore is not provided.

(Operations and Effects)

Figure 4B:
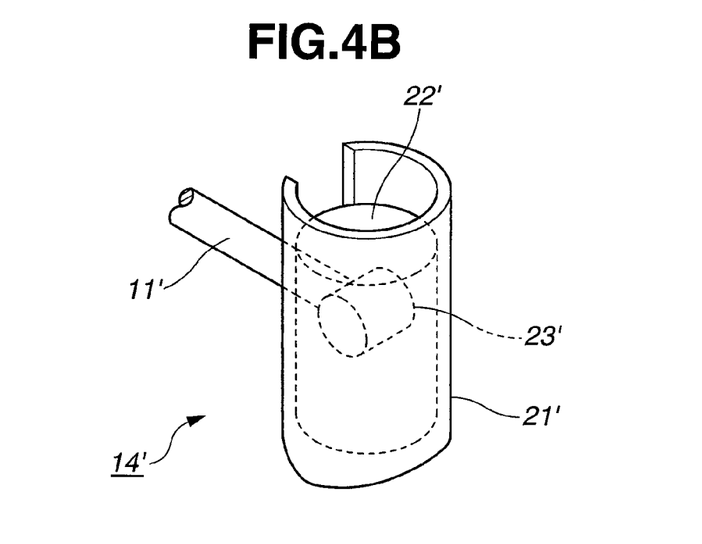
FIG. 4B is an assembled state of the displacement absorbing section in the second embodiment.

According to the second embodiment, the assembling of the displacement absorbing section 14' is as follows. The one end of the screw shaft 11' which does not rotate is laterally (i.e., from a radially outside of cylindrical-column shape of the intermediate member 22') inserted through the first lateral-insertion cutout portion 22d to the insertion hole 22b' at the same time when the retaining member 23' formed at the one end of the screw shaft 11' is inserted into the second circular hole 22a' of the intermediate member 22'. Then, the one end of the screw shaft 11' is laterally inserted (i.e., from an axially outside of circular-tube shape of the base member 21') into the cutout portion 21b' at the same time when the intermediate member 22' receiving the retaining member 23' is inserted into the first circular hole 21a' of the base member 21'. Thereby, the base member 21', the intermediate member 22' and the retaining member 23' are set up together with one another as shown in FIG. 4B, so that a state is attained where the screw shaft 11' has been linked to the displacement absorbing section 14'.

According to the electric telescopic steering apparatus in the second embodiment, the assembling of the displacement absorbing section 14' is finished by only two operations of (1) inserting the retaining member 23' integrally formed with the one end of the screw shaft 11' into the second circular hole 22a' of the intermediate member 22' and (2) inserting the intermediate member 22' holding the retaining member 23' into the first circular hole 21a' of the base member 21'. Therefore, the assembling workability of the displacement absorbing section 14' is excellent. Moreover, since the collar 24 and the fixing nut 25 of the first embodiment is unnecessary in the second embodiment, the number of components is reduced as compared with the electric telescopic steering apparatus of the first embodiment. Moreover, since a rotation-preventing structure such as the rotation-preventing recess 23b and the rotation-preventing protrusion 11a is unnecessary in the second embodiment, a manufacturing cost can be reduced.

Some technical structures and advantageous effects obtainable from the above embodiments according to the present invention will now be listed as follows.

[a] An electric telescopic steering apparatus comprising: a jacket (3) including a lower jacket (3a) and an upper jacket (3b) configured to slide relative to the lower jacket (3a) in an axial direction of the lower jacket (3a) so as to telescope the jacket (3); a screw shaft (11, 11') arranged along a longitudinal direction of the jacket (3) and held under a state where a rotation of the screw shaft (11, 11') is locked by the jacket (3), wherein the screw shaft (11, 11') includes one end portion supported by one of the lower jacket (3a) and the upper jacket (3b); a nut (12) screwed on another end portion of the screw shaft (11, 11') and supported by another of the lower jacket (3a) and the upper jacket (3b); a driving section (13, 17, 20) configured to drive a rotation of the nut (12); and a displacement absorbing section (14, 14') provided between the one end portion of the screw shaft (11, 11') and the jacket (3), wherein the displacement absorbing section (14, 14') is configured to permit the one end portion of the screw shaft (11, 11') to be displaced on an X-Y plane defined by an imaginary X-axis and an imaginary Y-axis which are substantially perpendicular to an axis of the screw shaft (11, 11'), wherein the displacement absorbing section (14, 14') is configured to permit an angle of the axis of the screw shaft (11, 11') to vary about the X-axis and the Y-axis.

Accordingly, advantageous effects are as follows, for example. When the rotation of the telescopic-function nut 12 is driven to slide the upper jacket 3b relative to the lower jacket 3a; the relative position between the one end portion of the rotation-locked screw shaft 11 or 11' and the jacket 3 might try to vary on the X-Y plane (in directions perpendicular to the axis of the jacket 3 or the screw shaft 11), and/or the angle formed by the axis of the screw shaft 11 or 11' and the axis of the jacket 3 might try to vary (i.e., angles defined about the X-axis and the Y-axis might try to turn). In this case, these variations are absorbed by the displacement absorbing section 14 or 14'.

In other words, if the axis of the screw shaft 11 or 11' is in a deviated state from the axis of the telescopic-function nut 12 so that the screw shaft 11 or 11' is not accurately parallel to the jacket 3; the location of the one end portion of the rotation-locked screw shaft 11 or 11' relative to the jacket 3 might be displaced on the X-Y plane, and/or the extending direction of the screw shaft 11 or 11' might try to vary relative to the extending direction of the jacket 3 during the rotation of the telescopic-function nut 12. Since such possible variations are absorbed by the displacement absorbing section 14 or 14', a load which is cased when the upper jacket 3b slides in the lower jacket 3a is lightened to achieve a smooth sliding motion. Therefore, at the time of telescopic adjustment, the upper jacket 3b of movable side can be prevented from fluctuating or swinging due to push-and-pull pressures (i.e., due to the load) to fluctuate the combination switch and the steering wheel attached to the upper jacket 3b. Moreover, the operating noise which is caused due to the push-and-pull pressures can be prevented from occurring.

[b] The electric telescopic steering apparatus as described in the item [a], wherein the displacement absorbing section (14, 14') includes a base member (21, 21') fixed to the one of the lower jacket (3a) and the upper jacket (3b), wherein the base member (21, 21') includes a first circular hole (21a, 21a') extending substantially perpendicular to the longitudinal direction of the jacket (3); an intermediate member (22, 22') received in the first circular hole (21a, 21a') of the base member (21, 21') to be able to rotate and slide in the first circular hole (21a, 21a'), wherein the intermediate member (22, 22') includes a second circular hole (22a, 22a') intersecting with the axis of the screw shaft (11, 11'), wherein the second circular hole (22a, 22a') has an axis substantially perpendicular to both of the axis of the screw shaft (11, 11') and an axis of the first circular hole (21a, 21a'); and a retaining member (23, 23') received in the second circular hole (22a, 22a') of the intermediate member (22, 22') to be able to rotate and slide in the second circular hole (22a, 22a'), wherein the retaining member (23, 23') retains the one end portion of the screw shaft (11, 11') under the state where a rotation of the one end portion of the screw shaft (11, 11') is locked.

According to this structure, since the displacement absorbing section 14 or 14' is constituted by the base member 21 or 21', the intermediate member 22 or 22' received in the base member 21 or 21', and the retaining member 23 or 23' received in the intermediate member 22 or 22', the structure of the displacement absorbing section 14 or 14' is simple.

[c] The electric telescopic steering apparatus as described in the item [b], wherein the displacement absorbing section (14, 14') further includes a first escape portion (22b, 22b') formed in the intermediate member (22, 22') to prevent an interference between the intermediate member (22, 22') and the one end portion of the screw shaft (11, 11'), and a second escape portion (21b, 21b') formed in the base member (21, 21') to prevent an interference between the base member (21, 21') and the one end portion of the screw shaft (11, 11').

According to this structure, since the intermediate member 22 or 22' slides in the first circular hole 21a or 21a' of the base member 21 or 21', and the retaining member 23 or 23' slides in the second circular hole 22a or 22a' of the intermediate member 22 or 22'; the one end portion of the screw shaft 11 or 11' is permitted to be displaced on the X-Y plane. Moreover, since the intermediate member 22 or 22' turns (rotates) in the first circular hole 21a or 21a' of the base member 21 or 21', and the retaining member 23 or 23' turns (rotates) in the second circular hole 22a or 22a' of the intermediate member 22 or 22'; the angle of axis of the screw shaft 11 or 11' with respect to the axis of the jacket 3 is permitted to vary around the X-axis in the turning direction of the intermediate member 22 or 22' and is permitted to vary around the Y-axis in the turning direction of the retaining member 23 or 23'.

[d] The electric telescopic steering apparatus as described in the item [c], wherein the retaining member (23) includes a through hole (23a) formed along the axis of the screw shaft (11), and includes a rotation-preventing recess (23b) formed in a screw-shaft side of the retaining member (23), wherein the screw shaft (11) includes a rotation-preventing protrusion (11a) formed integrally with the screw shaft (11) near the one end portion of the screw shaft (11), wherein the rotation-preventing protrusion (11a) is fitted into the rotation-preventing recess (23b), wherein a fixing nut (25) is screwed through a collar (24) on the one end portion of the screw shaft (11) inserted through the through hole (23a) of the retaining member (23).

[e] The electric telescopic steering apparatus as described in the item [d], wherein a third escape portion (22c) is formed in the intermediate member (22) to prevent an interference between the intermediate member (22) and the collar (24), and wherein a fourth escape portion (21c) is formed in the base member (21) to prevent an interference between the base member (21) and the collar (24).

According to this structure, in order to assemble the displacement absorbing section 14, the following procedure is conducted. At first, the retaining member 23 is inserted into the second circular hole 22a of the intermediate member 22. Next, the intermediate member 22 in which the retaining member 23 has been disposed is inserted into the first circular hole 21a of the base member 21. Next, under the state where the retaining member 23, the intermediate member 22 and the base member 21 have been set up with one another, the one end portion of the screw shaft 11 is inserted through the second escape portion 21*b* and the first escape portion 22*b* into the through hole 23*a* of the retaining member 23. Then, the rotation-preventing protrusion 11*a* is fitted into the rotation-preventing recess 23*b* of the retaining member 23. Next, the collar 24 is fitted over a part of the one end portion of the screw shaft 11 which is to be located at the third escape portion 22*c* and the fourth escape portion 21*c*, and then, the fixing nut 25 is screwed through the collar 24 on the one end portion of the screw shaft 11.

That is, after the retaining member 23, the intermediate member 22 and the base member 21 have been set up with one another, the one end portion of the screw shaft 11 is inserted through the through hole 23*a* of the retaining member 23 and combined with the retaining member 23. Therefore, the setup between the retaining member 23, the intermediate member 22 and the base member 21 can be carried out in advance. Hence, the workability of the assembling of the displacement absorbing section 14 is superior.

[f] The electric telescopic steering apparatus as described in the item [c], wherein the retaining member (23') is formed integrally with the one end portion of the screw shaft (11'), wherein the intermediate member (22') includes a first cutout portion (22*d*) through which the one end portion of the screw shaft (11') is laterally inserted into the first escape portion (22*b'*) concurrently when the retaining member (23') is inserted into the second circular hole (22*a'*), and wherein the base member (21') includes a second cutout portion (21*b'*) through which the one end portion of the screw shaft (11') is laterally inserted into the second escape portion (21*b'*) concurrently when the intermediate member (22') is inserted into the first circular hole (21*a'*).

According to this structure, in order to assemble the displacement absorbing section 14', the following procedure is carried out. The one end portion of the screw shaft 11' is laterally inserted (i.e., from a radially outside of cylindrical-column shape of the intermediate member 22') through the first cutout portion 22*d* into the first escape portion 22*b'* at the same time when the retaining member 23' formed at the one end portion of the screw shaft 11' is inserted into the second circular hole 22*a'* of the intermediate member 22'. Next, the end portion of the screw shaft 11' is laterally inserted (i.e., from an axially outside of circular-tube shape of the base member 21') through the second cutout portion 21*b'* into the second escape portion 21*b'* at the same time when the intermediate member 22' receiving the retaining member 23' is inserted into the first circular hole 21*a'* of the base member 21'.

That is, the assembling of the displacement absorbing section 14' is finished by only two operations of ① inserting the retaining member 23' integrally formed with the one end portion of the screw shaft 11', into the second circular hole 22*a'* of the intermediate member 22' and ② inserting the intermediate member 22' into the first circular hole 21*a'* of the base member 21'. Therefore, the assembling workability of the displacement absorbing section 14' is superior. Moreover, since the collar 24 and the fixing nut 25 mentioned in the first embodiment is unnecessary in the second embodiment, the number of components is reduced as compared with the electric telescopic steering apparatus of the first embodiment. Moreover, since the rotation-preventing structure (such as the rotation-preventing recess 23*b* and the rotation-preventing protrusion 11*a*) is unnecessary in the second embodiment, the manufacturing cost can be reduced.

Although the invention has been described above with reference to certain embodiments of the invention, the invention is not limited to the embodiments described above.

Modifications and variations of the embodiments described above will occur to those skilled in the art in light of the above teachings.

This application is based on a prior Japanese Patent Application No. 2010-147023 filed on Jun. 29, 2010. The entire contents of this Japanese Patent Application are hereby incorporated by reference.

The scope of the invention is defined with reference to the following claims.

What is claimed is:

1. An electric telescopic steering apparatus comprising:
   a jacket including a lower jacket and an upper jacket configured to slide relative to the lower jacket in an axial direction of the lower jacket so as to telescope the jacket;
   a screw shaft arranged along a longitudinal direction of the jacket and configured to be held under a state where a rotation of the screw shaft is locked by the jacket,
   wherein the screw shaft includes one end portion supported by one of the lower jacket and the upper jacket;
   a nut screwed on another end portion of the screw shaft and supported by another of the lower jacket and the upper jacket;
   a driving section configured to drive a rotation of the nut; and
   a displacement absorbing section provided between the one end portion of the screw shaft and the jacket,
   wherein the displacement absorbing section is configured to permit the one end portion of the screw shaft to be displaced on an X-Y plane defined by an imaginary X-axis and an imaginary Y-axis which are substantially perpendicular to an axis of the screw shaft,
   wherein the displacement absorbing section is configured to permit an angle of the axis of the screw shaft to vary about the X-axis and the Y-axis,
   wherein the displacement absorbing section includes:
      a base member,
      an intermediate member received in the base member and configured to rotate and slide in the base member, and
      a retaining member received in the intermediate member and configured to rotate and slide in the intermediate member,
      wherein the intermediate member intersects with the axis of the screw shaft and has an axis substantially perpendicular to the axis of the screw shaft, and
      wherein the retaining member retains the one end portion of the screw shaft under the state where a rotation of the one end portion of the screw shaft is locked.

2. The electric telescopic steering apparatus according to claim 1, wherein the displacement absorbing section is configured such that:
   the base member is fixed to the one of the lower jacket and the upper jacket,
   wherein the base member includes a first circular hole extending substantially perpendicular to the longitudinal direction of the jacket,
   the intermediate member is received in the first circular hole of the base member and configured to rotate and slide in the first circular hole,
   wherein the intermediate member includes a second circular hole intersecting with the axis of the screw shaft,
   wherein the second circular hole has an axis substantially perpendicular to both of the axis of the screw shaft and an axis of the first circular hole; and
   the retaining member is received in the second circular hole of the intermediate member and configured to rotate and slide in the second circular hole.

3. The electric telescopic steering apparatus according to claim 2, wherein the displacement absorbing section further includes
   a first escape portion formed in the intermediate member and configured to prevent an interference between the intermediate member and the one end portion of the screw shaft; and
   a second escape portion formed in the base member and configured to prevent an interference between the base member and the one end portion of the screw shaft.

4. The electric telescopic steering apparatus according to claim 3,
   wherein the retaining member includes a through hole formed along the axis of the screw shaft, and includes a rotation-preventing recess,
   wherein the screw shaft includes a rotation-preventing protrusion formed integrally with the screw shaft near the one end portion of the screw shaft,
   wherein the rotation-preventing protrusion is fitted into the rotation-preventing recess,
   wherein a fixing nut is screwed through a collar on the one end portion of the screw shaft inserted through the through hole of the retaining member.

5. The electric telescopic steering apparatus according to claim 4,
   wherein a third escape portion is formed in the intermediate member and configured to prevent an interference between the intermediate member and the collar, and
   wherein a fourth escape portion is formed in the base member and configured to prevent an interference between the base member and the collar.

6. The electric telescopic steering apparatus according to claim 3,
   wherein the retaining member is formed integrally with the one end portion of the screw shaft,
   wherein the intermediate member includes a first cutout portion through which the one end portion of the screw shaft is laterally inserted into the first escape portion concurrently when the retaining member is inserted into the second circular hole, and
   wherein the base member includes a second cutout portion through which the one end portion of the screw shaft is laterally inserted into the second escape portion concurrently when the intermediate member is inserted into the first circular hole.

* * * * *